United States Patent
Kalis et al.

(10) Patent No.: US 7,219,867 B2
(45) Date of Patent: May 22, 2007

(54) MOUNT ASSEMBLY FOR ELECTRONIC DEVICES

(75) Inventors: Robert M. Kalis, Overland Park, KS (US); Joshua C. Reeson, Olathe, KS (US); Dale R. Langner, Louisburg, KS (US); Paul E. Skelton, Lenexa, KS (US)

(73) Assignee: Garmin Ltd.

( * ) Notice: Subject to any disclaimer, the term of this patent is extended or adjusted under 35 U.S.C. 154(b) by 28 days.

(21) Appl. No.: 11/181,261

(22) Filed: Jul. 14, 2005

(65) Prior Publication Data

US 2007/0012839 A1    Jan. 18, 2007

(51) Int. Cl.
    *A47F 5/00* (2006.01)
(52) U.S. Cl. .............................. 248/288.31; 248/205.5; 403/133; 403/135
(58) Field of Classification Search ........... 248/288.31, 248/288.51, 481, 483, 484, 683, 205.5, 205.7, 248/205.8, 205.9, 917, 919, 921; 403/133, 403/135, 144
    See application file for complete search history.

(56) References Cited

U.S. PATENT DOCUMENTS

| | | | |
|---|---|---|---|
| 1,186,428 A | 6/1916 | Newman | |
| 1,877,570 A | 9/1932 | Fitz Gerald | |
| 3,176,602 A * | 4/1965 | Wilt | 248/205.5 |
| 4,894,754 A | 1/1990 | Levilain | |
| 5,411,230 A | 5/1995 | Messinger | |
| 5,615,857 A | 4/1997 | Hook | |
| 5,845,885 A | 12/1998 | Carneval | 248/181.1 |
| 5,988,572 A * | 11/1999 | Chivallier et al. | 248/176.1 |
| 6,095,470 A | 8/2000 | Kalls | 248/309.1 |
| 6,129,321 A | 10/2000 | Minelli et al. | 248/183.1 |
| 6,173,933 B1 | 1/2001 | Whiteside et al. | 248/276.1 |
| 6,352,227 B1 | 3/2002 | Hathaway | |
| 6,371,345 B1 | 4/2002 | Leyden et al. | |
| 6,418,010 B1 | 7/2002 | Sawyer | |
| 6,427,959 B1 | 8/2002 | Kalis et al. | 248/288.11 |
| 6,439,530 B1 | 8/2002 | Schoenfish et al. | 248/348.08 |
| 6,464,185 B1 | 10/2002 | Minelli et al. | |
| 6,529,381 B1 | 3/2003 | Schoenfish | 361/725 |
| 6,663,064 B1 | 12/2003 | Minelli et al. | |
| 6,672,788 B2 * | 1/2004 | Hathaway | 403/90 |
| 6,690,268 B2 | 2/2004 | Schofield et al. | |
| 6,802,275 B2 | 10/2004 | Schmidt | |

(Continued)

FOREIGN PATENT DOCUMENTS

DE        1995786 U    10/1968

(Continued)

*Primary Examiner*—Ramon O Ramirez
(74) *Attorney, Agent, or Firm*—David L. Terrell

(57) ABSTRACT

A mounting assembly for portable electronic devices includes a mount (12) with a mounting ball (16) that mates with a socket assembly (22) formed in a housing (18) of an electronic device (20). The socket assembly includes an orifice (32) formed in the back of the housing, a seat (34) positioned in the orifice for matingly receiving the ball, and a spring element (36) partially surrounding the seat. The seat includes a concave center portion (38) and a plurality of flexible, interconnected arms (40,42,44) extending from the concave center portion. The spring element substantially encircles the flexible arms to allow the flexible arms to flex outward when receiving the ball and to then contract inwardly to contact the ball when the ball is seated fully in the seat.

29 Claims, 2 Drawing Sheets

| U.S. PATENT DOCUMENTS | | | | FOREIGN PATENT DOCUMENTS | | |
|---|---|---|---|---|---|---|
| 6,902,345 B2 * | 6/2005 | Kur ............................ 403/135 | | DE | 19638388 A1 | 4/1998 |
| 6,913,232 B2 | 7/2005 | Richter | | FR | 1251433 A | 1/1964 |
| 6,973,377 B2 | 12/2005 | Majstorovic et al. | | SU | 1791209 * | 4/1965 |
| 2004/0093129 A1 | 5/2004 | Majstorovic et al. | | WO | WO 0065308 A1 | 11/2000 |
| 2005/0006575 A1 | 1/2005 | Heslin et al. | | | | |
| 2006/0177262 A1 | 8/2006 | Richter | | * cited by examiner | | |

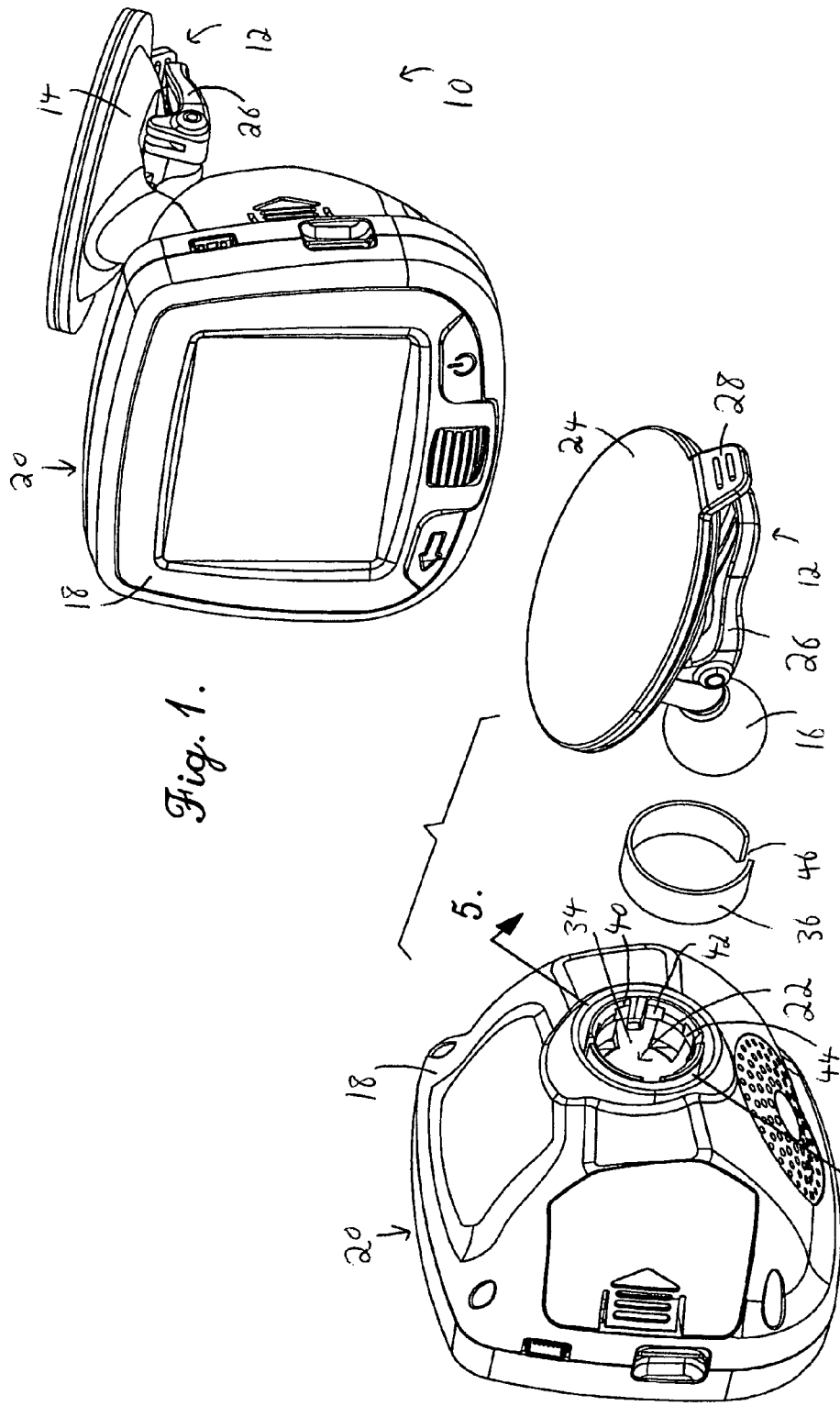

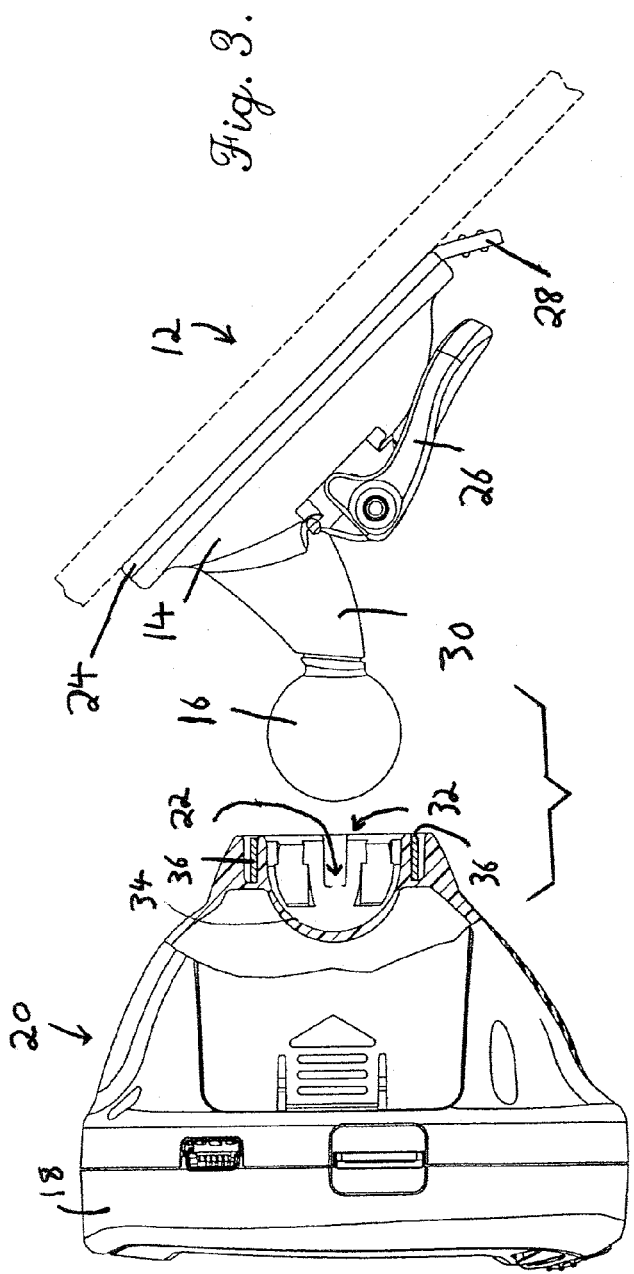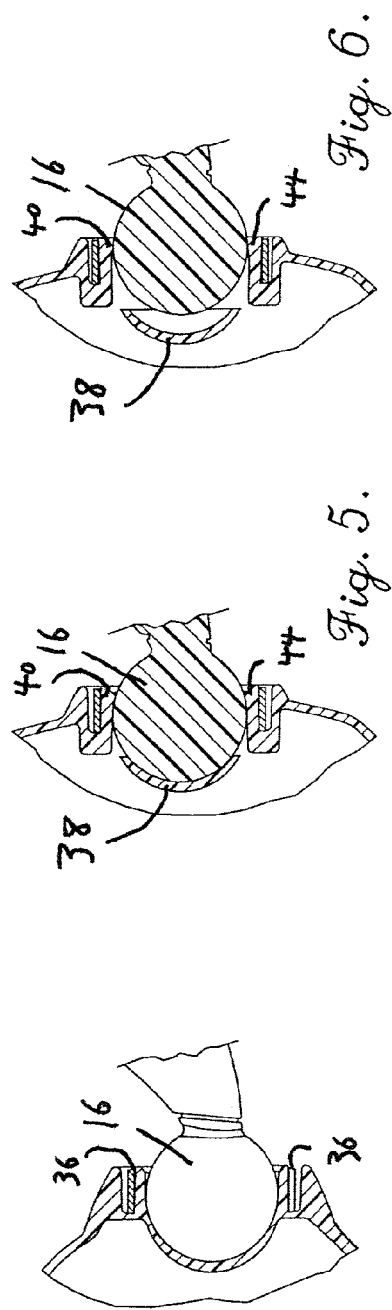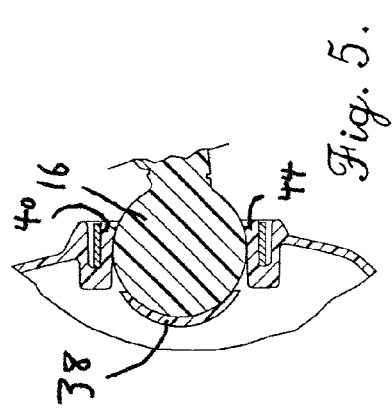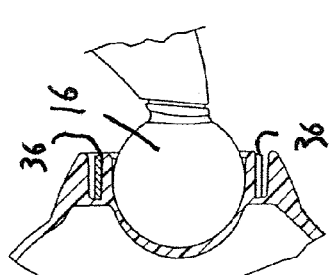

MOUNT ASSEMBLY FOR ELECTRONIC DEVICES

BACKGROUND OF THE INVENTION

1. Field of the Invention

The present invention relates to the field of mounting assemblies for electronic devices. More particularly, the invention relates to a mounting assembly with a ball and socket joint, wherein the ball and socket are easily separable for quick installation and removal of an electronic device.

2. Description of the Prior Art

The use of electronic devices in vehicles has increased in recent years. For example, it is increasingly more common to see electronic devices such as global positioning satellite (GPS) devices, portable telephones, radios and personal digital assistants (PDAs) mounted within vehicles either permanently or, in the case of portable electronics, removably. Many of these devices have displays which visibly communicate information to one or more users. Thus, it is advantageous to be able to adjust a position and angle of such devices to provide maximum viewing capability to the user or users. Portable devices are further advantageous in that they can be taken from the vehicle and used outside of the vehicle.

Due to the wide variety of electronic devices that can be mounted within a vehicle, many different types of mounting apparatuses exist that can secure an electronic device to the dashboard, windshield, floor, or other support surface in a vehicle such that a user may adjust a position of the device. One type of mounting apparatus used with portable electronic devices includes a base connected to a cradle via a ball and socket joint. The base is fixedly or permanently secured to a surface of the vehicle, and the ball and socket joint allows the cradle to be selectively positioned in any of a broad range of positions relative to the base. The cradle receives an electronic device and retains the electronic device with screws or similar fastening devices, allowing a user to selectively adjust a position or orientation of the electronic device.

While this type of prior art mounting apparatus is operable to mount a portable electronic device to a vehicle so that the device can be repositioned, it suffers from certain limitations. The cradles of prior mount apparatuses increase the size, weight, and cost of the apparatus, for example, and require a user to loosen or tighten the screws or other fasteners each time the electronic devices are mounted to or removed from the cradles, and loosen and subsequently tighten the screws each time it is desired to re-position the electronic devices.

Accordingly, there is a need for an improved vehicle mounting apparatus for a portable electronic device that does not suffer from the problems and limitations of the prior art.

SUMMARY OF THE INVENTION

The present invention solves the above-described problems and provides a distinct advance in the art of vehicle mounting assemblies for electronic devices. More particularly, the present invention involves a mounting assembly with a separable ball and socket joint that eliminates the need for a cradle interposed between a mount and an electronic device.

According to a first embodiment, the invention comprises a mount that may be secured to a surface of a vehicle, a mounting ball projecting from the mount, and a housing for encasing an electronic device. The housing includes a socket assembly for receiving and frictionally engaging the ball to retain the housing in a fixed position relative to the mount.

According to a second embodiment of the invention, the socket assembly comprises an orifice formed in the back of the housing, a seat positioned in the orifice for matingly receiving the ball, and a spring element partially surrounding the seat. The seat includes a concave portion and flexible, interconnected arms extending from the concave portion for contacting an outer surface of the ball and frictionally resisting rotation of the ball relative to the orifice. The spring element substantially encircles the flexible arms to allow the flexible arms to flex outward when receiving the ball and to then contract inwardly to firmly hold the ball when the ball is seated fully in the seat.

A third embodiment of the invention involves an assembly for removably mounting an electronic device to a vehicle. The assembly comprises a suction-cup mount removably attachable to a surface of the vehicle, a mounting ball projecting from the mount, an electronic device with a housing for encasing the electronic device, and a socket assembly integrally formed in the housing. The socket assembly includes an orifice formed in the back of the housing, a seat positioned in the orifice for matingly receiving the ball, and a spring element partially surrounding the seat. The seat further includes a concave center portion and a plurality of flexible, interconnected arms extending from the concave portion. The arms form a cage smaller in diameter than the ball when the arms are in a relaxed state and are curved to substantially conform to the outer surface of the ball and to engage a hemisphere of the ball distal the concave center portion to retain the ball in the seat. The spring element includes a metal spring ring substantially encircling the arms, wherein the spring ring allows the arms to flex outward when receiving and releasing the ball, and to contract inwardly to contact the ball when the ball is seated fully in the seat.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 1 is a perspective view of a mounting assembly for a portable electronic device constructed according to a preferred embodiment of the invention;

FIG. 2 is an exploded rear perspective view of the mounting assembly of FIG. 1, illustrating a ball and socket joint that separably secures an electronic device to a mount;

FIG. 3 is a side elevation view of the mounting assembly of FIG. 1, wherein the ball is illustrated separated from the socket;

FIG. 4 is a fragmentary view of the ball and socket of the mounting assembly of FIG. 1, wherein the ball is snapped into the socket;

FIG. 5 is a fragmentary view of the ball and socket of the mounting assembly of FIG. 1 taken along line 5-5 of FIG. 2, wherein the ball is snapped into the socket; and FIG. 6 is a fragmentary view of the ball and socket of the mounting assembly of FIG. 1, wherein a plurality of plastic arms of the socket are flexed outward to allow the ball to pass into the socket.

DETAILED DESCRIPTION OF THE PREFERRED EMBODIMENTS

Referring initially to FIGS. 1 and 2, an exemplary mounting assembly for electronic devices employing the principles of the present invention is shown and designated generally by the reference numeral 10. The mounting assembly 10 comprises a mount 12 including a base 14 and a mounting ball 16; and a housing 18 for a portable electronic device 20, wherein the housing 18 presents a socket assembly 22 for receiving the ball 16.

The mount 12 removably secures to a surface of a vehicle (see FIG. 3), such as a windshield of the vehicle, and supports the electronic device 20 in view of a user, such as a vehicle driver or passenger. The mount 12 includes a rigid circular base 14 that is generally convex so as to curve away from the vehicle surface. A flexible sheet 24 is positioned between the base 14 and the vehicle surface for engaging the vehicle surface with a vacuum grip, wherein an air-tight seal is created between the flexible sheet 24 and the vehicle surface. The mount 12 can also be replaced with a mount that is more permanently applied to the windshield or other surface with adhesives, a mount with a weighted base that rests on a vehicle dashboard, or any other type of mounting device.

A lever 26 is positioned generally in a center of the base 14 and connects to a center of the flexible sheet 24 through the base 14 and enables the user to actuate the flexible sheet 24 to create the vacuum gripping function. A tab 28 of the flexible sheet 24 extends beyond a rim of the base 14 and enables a user to release the mount 12 by breaking the air-tight seal between the flexible sheet 24 and the vehicle surface. The vacuum grip or "suction cup" function of the mount 12 is substantially conventional in nature and therefore will not be described in greater detail here.

Referring also to FIG. 3, the ball 16 is connected to the base 14 via a neck 30 projecting from the base 14. The neck 30 is eccentrically located on the base 14 and projects substantially normally therefrom, but projects slightly away from a center of the base 14. The ball 16 is connected to the neck 30 such that a center of the ball 16 is proximate a line extending normally from an edge of the base 14 and is spaced approximately one and one-quarter inches from the base 14. The ball 16 is substantially rigid to prevent deformation thereof and presents an outer surface that introduces sufficient friction between the ball 16 and the socket assembly 22 to resist movement of the electronic device 20 relative to the mount 12. The ball 16 is thus constructed of plastic or another sturdy material that presents a rough surface, or is coated to present a rough or soft surface with the friction characteristics described above.

The electronic device 20 may be any portable electronic device to be removably mounted in a vehicle. The illustrated device 20 is a model i3 STREETPILOT™ GPS-based navigational device manufactured by GARMIN™. The housing 18 of the electronic device 20 encases the electronic device 20 and is substantially conventional, except that the housing 18 presents a socket assembly 22 for removably connecting directly to the ball 16 of the mount 12, wherein the socket assembly 22 frictionally engages the ball 16 to retain the housing 18 in a fixed position relative to the mount 12. The socket assembly 22 generally comprises an orifice 32 formed in the back of the housing 18, a seat 34 positioned in the orifice 32 for matingly receiving the ball 16, and a spring element 36 partially surrounding the seat 34.

The seat includes a concave center portion 38 and a plurality of flexible, interconnected arms. In one embodiment, four arms 40,42,44 (only three of which are visible in the drawing figures) are spaced at 90° intervals and extend from the concave center portion. However, any number of arms may be provided without departing from the scope of the present invention. The concave center portion 38 presents a continuous, bowl-shaped surface concave to the orifice 32 such that the center portion 38 matingly receives the ball 16. The center portion 38 is constructed of plastic or other material presenting a surface that introduces friction between the center portion 38 and the ball 16 to resist movement of the ball 16 relative to the orifice 32. Furthermore, the center portion 38 is in a fixed position relative to the housing 18 and is substantially rigid so as not to yield to pressure exerted by the ball 16.

The arms 40,42,44 are connected to and extend from a periphery of the center portion 38 and are curved to form a circular cage, wherein the center portion 38 and the arms 40,42,44 together define a generally spherical cavity for receiving and retaining the ball 16. The ball 16 and seat 34 are constructed such that the ball 16 snaps into and out of the spherical cavity defined by the seat 34. When the arms 40,42,44 are in a relaxed or unflexed state, the inside of the cage formed by the arms 40,42,44 is slightly smaller in diameter than an external surface of the ball 16, such that when the ball 16 is inserted into the cage the arms 40,42,44 engage and press against the ball 16. In this manner, the arms 40,42,44 frictionally resist rotation of the ball 16 within the socket assembly 22 and require a user to manually push the electronic device 20 from a first position to a second position relative to the mount 12. FIGS. 4-5 illustrated the arms 40,42,44 engaging the ball 16 when the ball 16 is seated in the socket assembly 22.

The arms 40,42,44 curve around the ball 16 from the periphery of the center portion 38 to a point that is on a hemisphere of the ball 16 opposite the center portion 38 to retain the ball 16 in the seat 32. In other words, the arms 40,42,44 "reach around" the ball 16 from the center portion 38 such that the opening of the cage is smaller than the diameter of the ball 16. This allows the ball 16 to be snapped into the socket assembly 22 by forcing the ball 16 into the socket assembly 22 and toward the center portion 38 of the seat 32, wherein the arms 40,42,44 flex outwardly to allow a girth of the ball 16 to pass through the opening of the cage and then contract inward when the ball 16 is fully seated in the socket assembly 22. Likewise, the arms 40,42,44 release the ball 16 by flexing outward when the ball 16 is forced away from the center portion 38 of the seat 34 and out of the socket assembly 22. FIG. 6 illustrates the arms 40,42,44 flexing outward to accommodate passage of the ball 16.

The spring element 36 partially encircles the arms 40,42, 44 and is operable to bias the arms 40,42,44 inwardly to contact the ball 16 when the ball 16 is in the socket assembly 22, while allowing the arms 40,42,44 to flex outwardly to receive and release the ball 16. The illustrated spring element 36 is a metal spring ring that substantially encircles the arms 40,42,44, and is approximately one-quarter to one-half of an inch wide, approximately three-quarters of an inch in diameter, and presents a gap 46 of approximately one-eighth to one-quarter inch between ends. thereof. The gap 46 allows the spring ring to flex. When the ball 16 is not in the socket assembly 22, the spring element 36 is relaxed and applies little or no biasing pressure on the arms 40,42,44. When the ball 16 is forced into the socket assembly 22, the arms 40,42,44 flex outwardly, as discussed above, and engage the spring element 36, causing the spring element 36 to also flex outwardly wherein the gap 46 widens. When the ball 16 is snapped into the seated position the spring element 36 biases the arms 40,42,44 inwardly against the ball 16.

Thus, the arms 40,42,44 and the spring element 36 cooperate to frictionally resist rotation of the ball 16 within the socket assembly 22 and to retain the ball 16 in the socket assembly 22. The cooperation between the arms 40,42,44 and spring element 36 presents a distinct advance in the art because, among other things, the combination is more effective in retaining the ball 16 within the socket assembly 22 than either component would be individually. The arms 40,42,44 alone, for example, typically would not provide as strong a spring force as the combination of the arms 40,42, 44 and the spring element 36, and may permanently bend outward or even break after repeated use. Furthermore, the spring element 36 acting alone would provide less contact area with the ball 16, and metal would provide less friction against the ball 16 to resist rotation of the ball 16 within the socket assembly 22.

In use, the mount 12 is installed in a vehicle by selecting a suitably smooth and flat surface. Such a surface may be on a windshield, other window, or dashboard. Alternatively, a specially made material may be attached to a surface of the vehicle to provide a superior mounting surface for the suction cup mount. The mount 12 is pressed onto the surface and the lever 26 is flipped downward to secure the mount 12 to the surface via the vacuum grip function. Once the mount 12 is secured to the surface, the electronic device 20 may be easily snapped onto and off of the mount 12.

To secure the electronic device 20 to the mount 12, the user simply places the orifice 32 of the socket assembly 22 over the ball 16 and pushes the socket assembly 22 onto the ball 16. The electronic device 20 may then be repositioned as the user desires and the arms 40,42,44 will cause the electronic device 20 to remain in its current position. To remove the electronic device 20 from the mount 12, the electronic device 20 is rotated to an extreme angle relative to the mount 12, such as to the user's left or right, and then pushed beyond the angle to cause the socket assembly 22 to snap off of the ball 16. Alternatively, the electronic device 20 can be pulled straight out to cause the socket assembly to snap off the ball, but this requires more pulling force. The mount 12 is removed from the vehicle's surface by lifting the lever 26 away from the base 14 of the mount 12 to release the suction cup and the tab is pulled away from the vehicle surface.

Although the invention has been described with reference to a particular embodiment illustrated in the attached drawings, it is noted that equivalents may be employed and substitutions made herein without departing from the scope of the invention as recited in the claims. It will be appreciated, for example, that the metal spring ring 40 may be replaced with a similar element capable of biasing the arms 40,42,44 against the ball 16 including, for example, a plastic spring ring or a rubber or elastomer ring that entirely encircles the arms 40,42,44. Furthermore, the arms 40,42,44 need not be plastic buy may be constructed of any flexible, friction-producing material and may be connected to an element of the housing 18 other than the center portion 38. Further yet, it will be appreciated that use of the ball and socket assembly disclosed herein is not restricted to portable electronic devices, but may also be used to removably retain other devices, such as, for example, mirrors.

Having thus described the preferred embodiment of the invention, what is claimed as new and desired to be protected by Letters Patent includes the following:

1. A navigational device comprising:
    a mount for being secured to a surface of a vehicle and presenting a mounting ball; and
    a housing for encasing the navigational device, wherein the housing includes a socket assembly for receiving and frictionally engaging the ball to moveably attach the housing to the mount, wherein the socket assembly includes a seat formed of a flexible, friction-producing material biased against the ball, wherein sufficient friction exists between the friction-producing material and the ball to prevent the housing from moving relative to the mount in the absence of user-applied force.

2. The navigational device as set forth in claim 1, wherein the mount is a suction cup mount.

3. The navigational device as set forth in claim 1, wherein the friction-producing material includes a plastic element.

4. The navigational device as set forth in claim 1, wherein the seat includes a plurality of arms that form a cage substantially surrounding the ball.

5. The navigational device as set forth in claim 4, wherein the seat further includes a concave center portion, wherein the arms extend from a periphery of the center portion.

6. The navigational device as set forth in claim 5, wherein the arms are formed integrally with the center portion and extend from a periphery of the center portion.

7. The navigational device as set forth in claim 4, wherein the arms are curved to substantially conform to an outer surface of the ball and to engage a hemisphere of the ball distal the seat to retain the ball in the seat.

8. The navigational device as set forth in claim 1, wherein the friction-producing material is biased against the ball by a spring element.

9. The navigational device as set forth in claim 8, wherein the spring element includes a circular spring element that partially encircles the friction-producing material.

10. The navigational device as set forth in claim 9, wherein the circular spring element is a metal spring ring that substantially encircles the friction-producing material.

11. An assembly for removably mounting an electronic device to a vehicle, the assembly comprising:
    a suction-cup mount removably attachable to a surface of the vehicle;
    a mounting ball projecting from the mount;
    an electronic device with a housing for encasing the electronic device;
    an orifice in a back of the electronic device,
    a seat positioned in the orifice for matingly receiving the ball, the seat including—
        a concave center portion for receiving the ball, and
        a plurality of arms extending from a periphery of the center portion for contacting an outer surface of the ball and frictionally resisting rotation of the ball relative to the orifice, wherein the arms form a cage smaller in diameter than the ball when the arms are in a relaxed state, and wherein the arms are curved to substantially conform to the outer surface of the ball and to engage a hemisphere of the ball distal the center portion to retain the ball in the seat; and
    a metal spring ring substantially encircling the arms, wherein the spring ring allows the arms to flex outward to receive and to release the ball and biases the arms inwardly to contact the ball when the ball is fully seated in the seat.

12. A ball and socket assembly comprising:
a ball;
a seat for matingly receiving the ball, the seat including—
   a concave center portion, and
   a plurality of interconnected arms extending from the concave center portion for contacting an outer surface of the ball and frictionally resisting rotation of the ball relative to the seat; and
a spring element substantially encircling the arms, wherein the spring element allows the arms to flex outward to receive the ball and biases the arms inwardly to contact the ball when the ball is seated in the concave seat.

13. The assembly as set forth in claim 12, wherein the arms are formed of flexible material.

14. The assembly as set forth in claim 13, wherein the arms form a cage smaller in diameter than the ball when the arms are in a relaxed state.

15. The assembly as set forth in claim 14, wherein the arms are curved to substantially conform to the outer surface of the ball and to engage a hemisphere of the ball distal the concave center portion to retain the ball in the seat.

16. The assembly as set forth in claim 15, wherein the concave center portion is made of plastic and is integrally formed with the arms.

17. The assembly as set forth in claim 16, wherein the arms extend from a periphery of the concave center portion such that the concave center portion and the arms define a substantially spherical cavity.

18. The assembly as set forth in claim 12, wherein the spring element is a metal spring ring that substantially encircles the flexible material.

19. The assembly as set forth in claim 12, wherein the spring element is a plastic spring ring that substantially encircles the flexible material.

20. An assembly comprising:
an electronic navigation device with a housing for encasing the electronic device;
a mount secured to a surface of a vehicle, wherein the mount includes—
   a generally convex circular base,
   a suction cup positioned at least partially within the base,
   a curved neck projecting from the base, and
   a substantially rigid ball mounted to an end of the neck distal from the base; and
a socket assembly for receiving and frictionally engaging the ball to moveably attach the housing to the mount, wherein the socket assembly includes—
   a seat having a concave center portion formed of a friction-producing material into which the ball is biased, and
   a plurality of arms that form a cage around the ball.

21. The assembly as set forth in claim 20, wherein the friction-producing material includes a plastic element.

22. The assembly as set forth in claim 20, wherein the arms are formed integrally with the center portion and extend from a periphery of the center portion.

23. The assembly as set forth in claim 20, wherein the arms are curved to substantially conform to an outer surface of the ball and to engage a hemisphere of the ball distal the seat to retain the ball in the seat.

24. The assembly as set forth in claim 20, wherein the cage is smaller in diameter than the ball when the arms are in a relaxed state.

25. The assembly as set forth in claim 20, wherein the concave center portion is made of plastic and is integrally formed with the arms.

26. The assembly as set forth in claim 20, wherein the ball is mounted approximately one and one-quarter inches from the base.

27. The assembly as set forth in claim 20, wherein the ball is proximate a line extending normally from an edge of the base.

28. The assembly as set forth in claim 20, wherein the ball is offset from a line extending normally from a center of the base.

29. The assembly as set forth in claim 20, wherein sufficient friction exists between the friction-producing material and the ball to prevent the housing from moving relative to the mount in the absence of user-applied force.

* * * * *